(12) United States Patent
Yamaguchi

(10) Patent No.: US 9,348,323 B2
(45) Date of Patent: May 24, 2016

(54) DEVICE COOPERATION CONTROL SYSTEM AND METHOD BASED ON MOTION OF A MOBILE DEVICE

(71) Applicant: Oki Electric Industry Co., Ltd., Tokyo (JP)

(72) Inventor: Tokuo Yamaguchi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 541 days.

(21) Appl. No.: 13/743,478

(22) Filed: Jan. 17, 2013

(65) Prior Publication Data

US 2013/0204401 A1 Aug. 8, 2013

(30) Foreign Application Priority Data

Feb. 3, 2012 (JP) ................................. 2012-021959

(51) Int. Cl.
*G05B 11/01* (2006.01)
*G06F 21/31* (2013.01)

(52) U.S. Cl.
CPC ................ *G05B 11/01* (2013.01); *G06F 21/31* (2013.01)

(58) Field of Classification Search
None
See application file for complete search history.

(56) References Cited

U.S. PATENT DOCUMENTS

2005/0212911 A1* 9/2005 Marvit et al. ................. 348/154
2009/0079813 A1* 3/2009 Hildreth ...................... 348/14.03
2010/0275267 A1* 10/2010 Walker et al. .................. 726/26

FOREIGN PATENT DOCUMENTS

JP 2011-090482 A 5/2011

OTHER PUBLICATIONS

Teixeira et al.'PEM-ID: Identifying people by gait-matching using cameras and wearable accelerometers', Third ACM/IEEE International Conference on Distributed Smart Cameras, 2009, ICDSC 2009 pp. 1-8, 2009.*
Teixeira et al. 'Identifying People in Camera Networks using Wearable Accelerometers', PETRA 2009 Proceedings of the 2nd International Conference on Pervasive Technologies Related to Assistive Environments (2009).*

* cited by examiner

*Primary Examiner* — Mohammad Ali
*Assistant Examiner* — Bernard G Lindsay
(74) *Attorney, Agent, or Firm* — Rabin & Berdo, P.C.

(57) ABSTRACT

A mobile device and a display apparatus are caused to cooperate. A user is instructed to do a predetermined action and the user holds and moves the mobile device. A motion of the mobile device is detected by the mobile device and the motion of the user is detected by the display apparatus. A pair of the mobile device and the display apparatus that detect the same action at the same time is caused to cooperate.

5 Claims, 21 Drawing Sheets

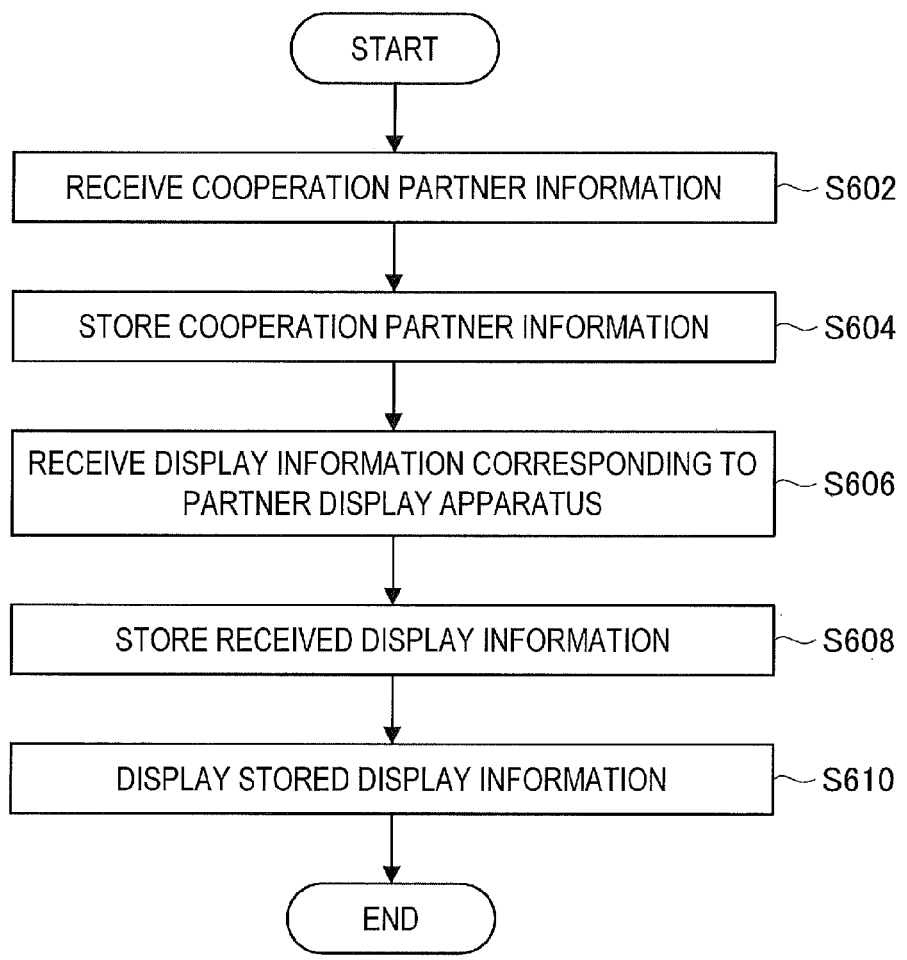

DEVICE COOPERATION CONTROL SYSTEM AND METHOD BASED ON MOTION OF A MOBILE DEVICE

CROSS REFERENCE TO RELATED APPLICATION(S)

This application is based upon and claims benefit of priority from Japanese Patent Application No. 2012-021959, filed on Feb. 3, 2012, the entire contents of which are incorporated herein by reference.

BACKGROUND

In recent years, there is a plurality of display apparatuses including display apparatuses for digital signage in public places, financial institutions, and airport lobbies.

Conventionally, the following method is used to realize cooperation between a display apparatus and a mobile device embedded sensors. For example, a two-dimensional barcode is arranged near the display apparatus, then user photographs the two-dimensional barcode with a camera of the mobile device. The mobile device decodes the two-dimensional barcode and changes the display contents of the mobile device by using the decoded information.

As another example, a non-contact IC (integrated circuit) card reader/writer is provided instead of the two-dimensional barcode. The user touches the mobile device closer to the non-contact IC card reader/writer. The mobile device read/write information from/to the non-contact IC card reader/writer with Near Filed Communication (NFC). The display apparatus and the mobile device change their display contents with the device cooperation.

In the above device cooperation control system, the user performs an operation of photographing a two-dimensional barcode with a camera of the mobile device or touching the mobile device closer to a non-contact IC card reader/writer. Thus, the load of operation on the user is sometimes heavy. When the mobile device is away from the display apparatus, (it becomes impossible to photograph a two-dimensional barcode arranged near the display apparatus or to communicate with a non-contact IC card reader/writer) and it is difficult to realize the device cooperation control system.

As still another example, a mobile device described in Japanese Patent Application Laid-Open No. 2011-90482 identifies a display apparatus for electronic signboard by using position information and orientation information acquired from sensors contained in the mobile device. A publicly known technology that stores a history of advertisements visually recognized by the user in the mobile device is available.

SUMMARY

It is desirable to provide a device cooperation control system that causes devices to cooperate accurately with a light load on the user.

A device cooperation control system having a device and a control apparatus, wherein the device includes a communication unit to which a first sensor value detected in accordance with a motion of the device is input and which transmits the first sensor value to the control apparatus and the control apparatus includes a second sensor value acquisition unit that inputs a second sensor value detected in accordance with the motion of an object positioned in front of an apparatus and a cooperation partner decision unit that determines whether a correspondence between the motion of the device and the motion of the object positioned in front of the predetermined apparatus is present based on the first sensor value and the second sensor value to decide the device to be a partner that cooperates with the predetermined apparatus based on a determination result.

BRIEF DESCRIPTION OF THE DRAWINGS

FIGS. 1 to 21 are diagrams illustrating a first embodiment of the invention.

FIG. 1 is a function block diagram of a display apparatus;

FIG. 2 is a function block diagram of a control apparatus;

FIG. 3 is a function block diagram of a mobile device;

FIG. 4 is an external view showing a device cooperation system;

FIG. 5 is an external view showing the display apparatus and the control apparatus;

FIG. 6 is a function block diagram regarding a cooperation between the display apparatus and the control apparatus of a function configuration of the display apparatus and the control apparatus;

FIG. 7 is a block diagram of a display information DB;

FIG. 8 is a conceptual diagram illustrating acquired data sequence process processing by an apparatus forward state recognition unit;

FIG. 9 is a flow diagram showing the flow of display control processing from the control apparatus to the display apparatus;

FIG. 10 is a flow diagram showing the flow of user's motion detection processing and detection result transmission processing;

FIG. 11 is a function block diagram regarding the cooperation between the control apparatus and the mobile device of the function configuration of the control apparatus and the mobile device;

FIG. 12 is a graph showing time series data in a direction in which an acceleration sensor is located;

FIG. 13 is a flow diagram showing the flow of user's motion detection processing and detection result transmission processing;

FIG. 14 is a function block diagram regarding the cooperation between the display apparatus and the mobile device of the function configuration of the display apparatus, the control apparatus, and the mobile device;

FIG. 15 is a block diagram of a detection information storage DB;

FIG. 16 is a data block diagram illustrating cooperation partner decision processing;

FIG. 17 is a block diagram of a cooperation state storage DB;

FIG. 18 is a flow diagram showing the flow of cooperation partner decision processing and cooperation partner information transmission processing;

FIG. 19 is a flow diagram showing the flow of cooperation partner information and display information reception processing;

FIG. 20 is a flow diagram showing the flow of cooperation partner information and display information reception processing; and FIG. 21 is an external view showing a display example.

DETAILED DESCRIPTION OF THE EMBODIMENT(S)

A preferred embodiment of the invention will be described in detail.

An overall configuration of a device cooperation system 10 according to the first embodiment will be described. The device cooperation system 10 includes a display apparatus 100, a control apparatus 200, and a mobile device 300.

As used herein the term "cooperation" means that it seems to the user that the display apparatus 100 and the mobile device 300 exchange information. For example, if the user swings the mobile device 300, information is displayed in the display apparatus 100 or in the mobile device 300.

Figure 1:
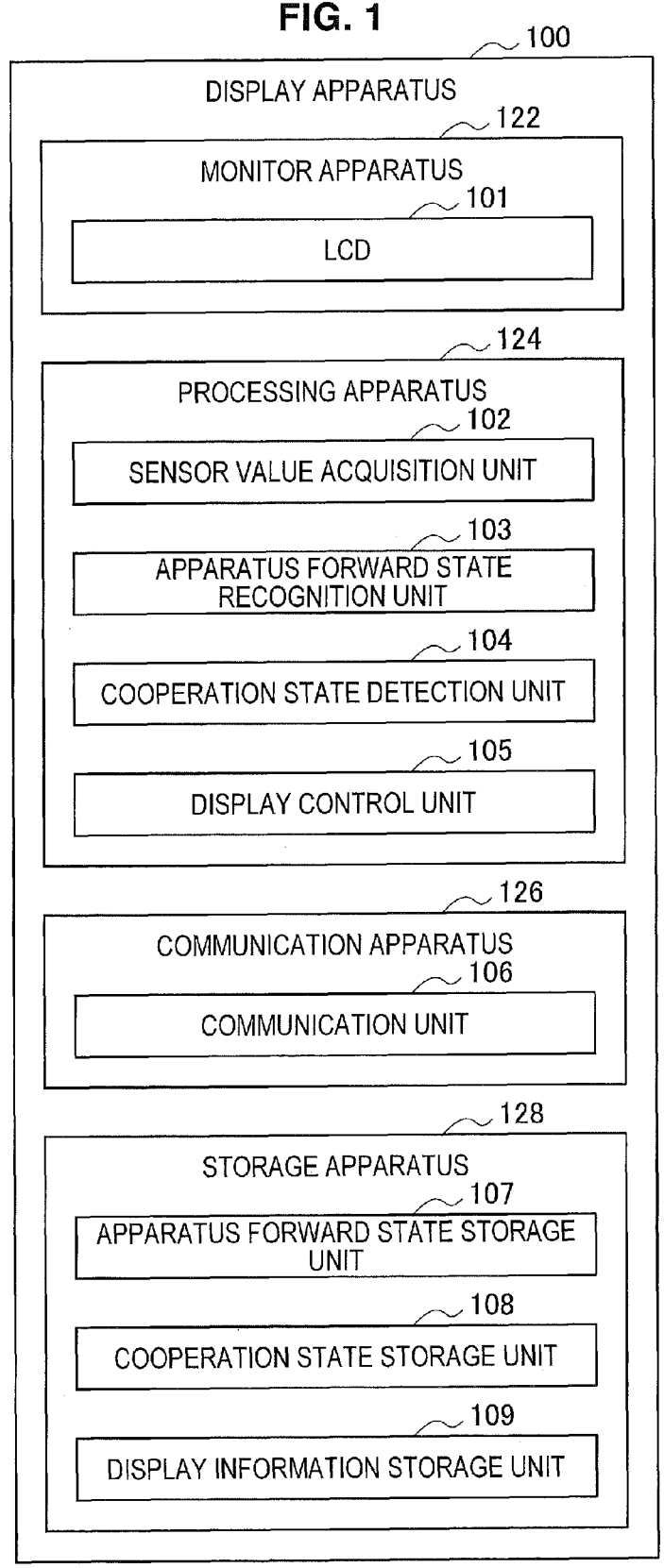

FIG. 1 is a function block diagram showing an example of the configuration of the display apparatus 100. The display apparatus 100 mainly includes a monitor apparatus 122, a processing apparatus 124, a communication apparatus 126, and a storage apparatus 128. The monitor apparatus 122 includes an LCD 101 (Liquid Crystal Display) as a display unit. The LCD 101 may also be configured by other display units such as an OLED (Organic Light Emitting Diode). The processing apparatus 124 includes a sensor value acquisition unit 102, an apparatus forward state recognition unit 103, a cooperation state detection unit 104, and a display control unit 105. The communication apparatus 126 includes a communication unit 106. The storage apparatus 128 includes an apparatus forward state storage unit 107, a cooperation state storage unit 108, and a display information storage unit 109.

Figure 2:
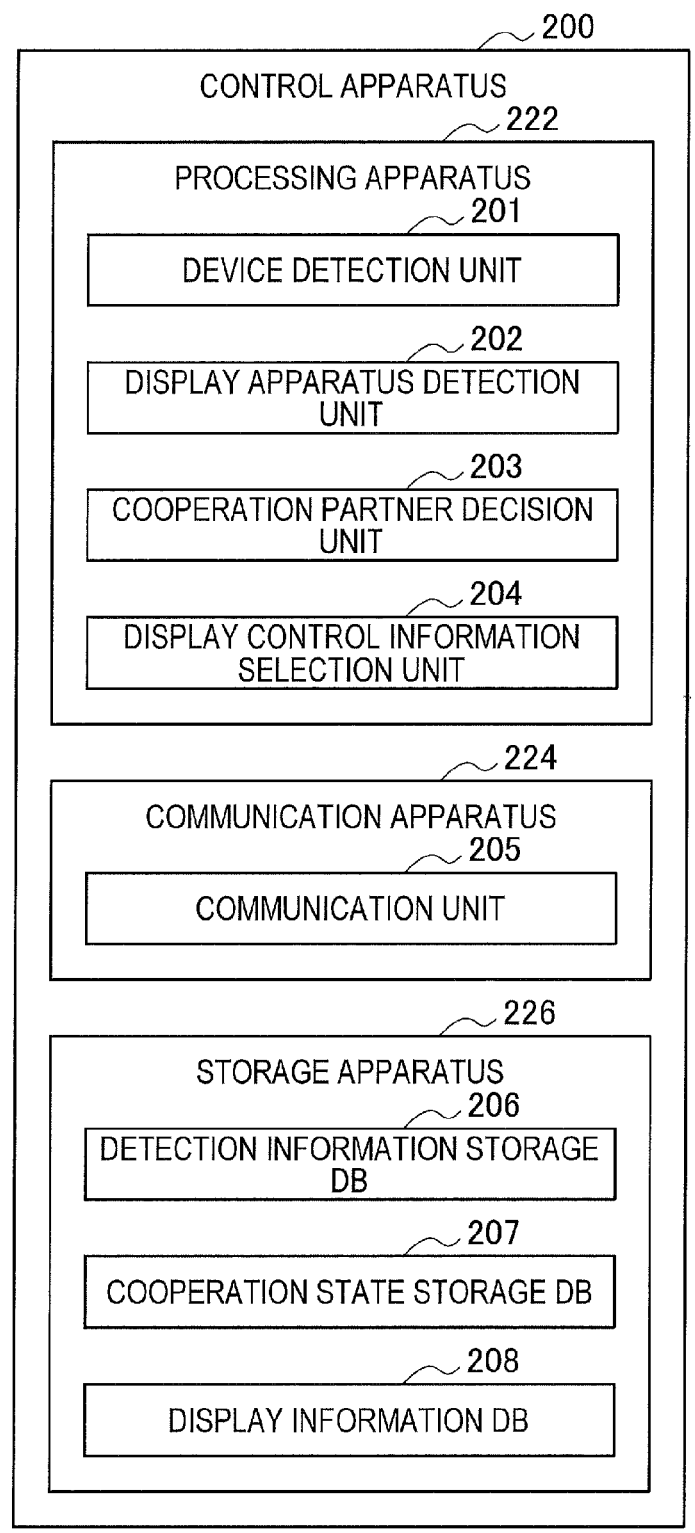

FIG. 2 is a function block diagram showing an example of the configuration of a control apparatus. The control apparatus 200 mainly includes a processing apparatus 222, a communication apparatus 224, and a storage apparatus 226.

The processing apparatus 222 includes a device detection unit 201, a display apparatus detection unit 202, a cooperation partner decision unit 203, and a display control information selection unit 204. The communication apparatus 224 includes a communication unit 205. The storage apparatus 226 includes a detection information storage DB (database) 206, a cooperation state storage DB (database) 207, and a display information DB (database) 208.

Figure 3:
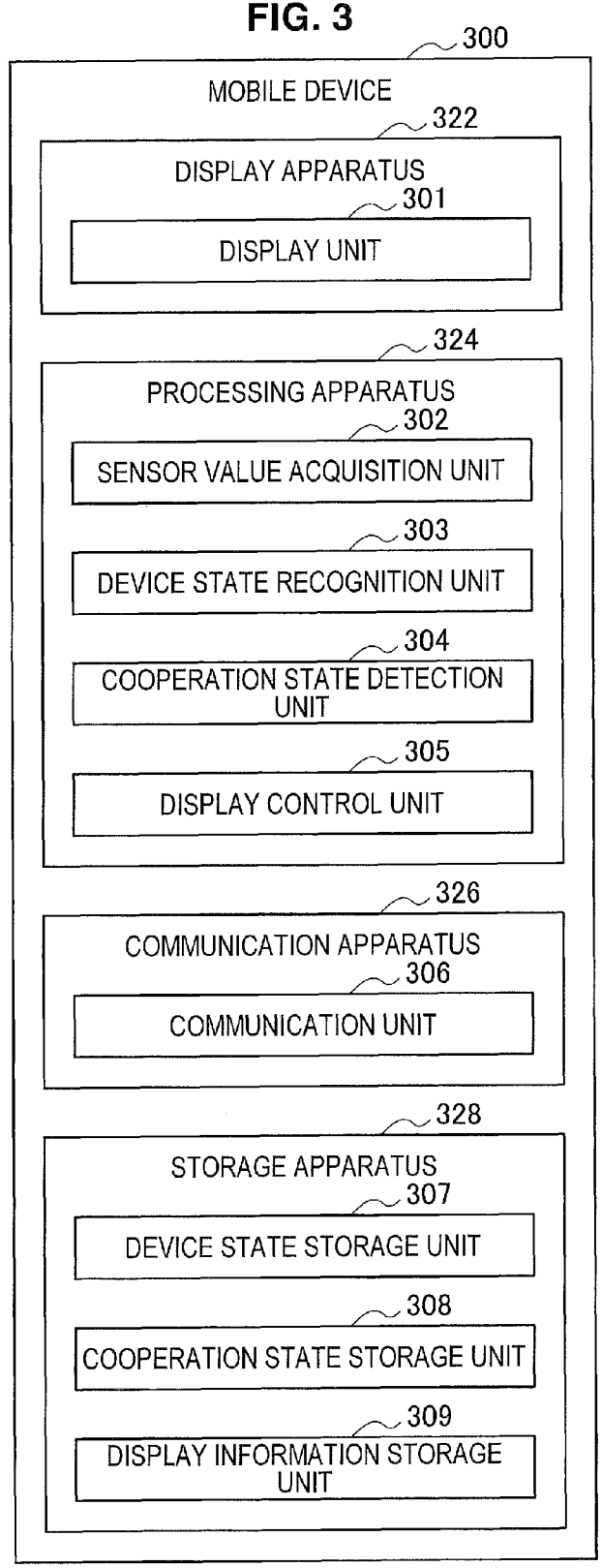

FIG. 3 is a function block diagram showing an example of the configuration of the mobile device 300. The mobile device 300 mainly includes a display apparatus 322, a processing apparatus 324, a communication apparatus 326, and a storage apparatus 328.

The display apparatus 322 includes a display unit 301. The processing apparatus 324 includes a sensor value acquisition unit 302, a device state recognition unit 303, a cooperation state detection unit 304, and a display control unit 305. The communication apparatus 326 includes a communication unit 306. The storage apparatus 328 includes a device state storage unit 307, a cooperation state storage unit 308, and a display information storage unit 309. The mobile device 300 is, for example, a handheld video game console, personal data assistance (PDA), personal computer or the like.

The control apparatus 200 may include the configuration of the display apparatus 100. The control apparatus 200 may also include a portion of functions of the mobile device 300.

Figure 4:
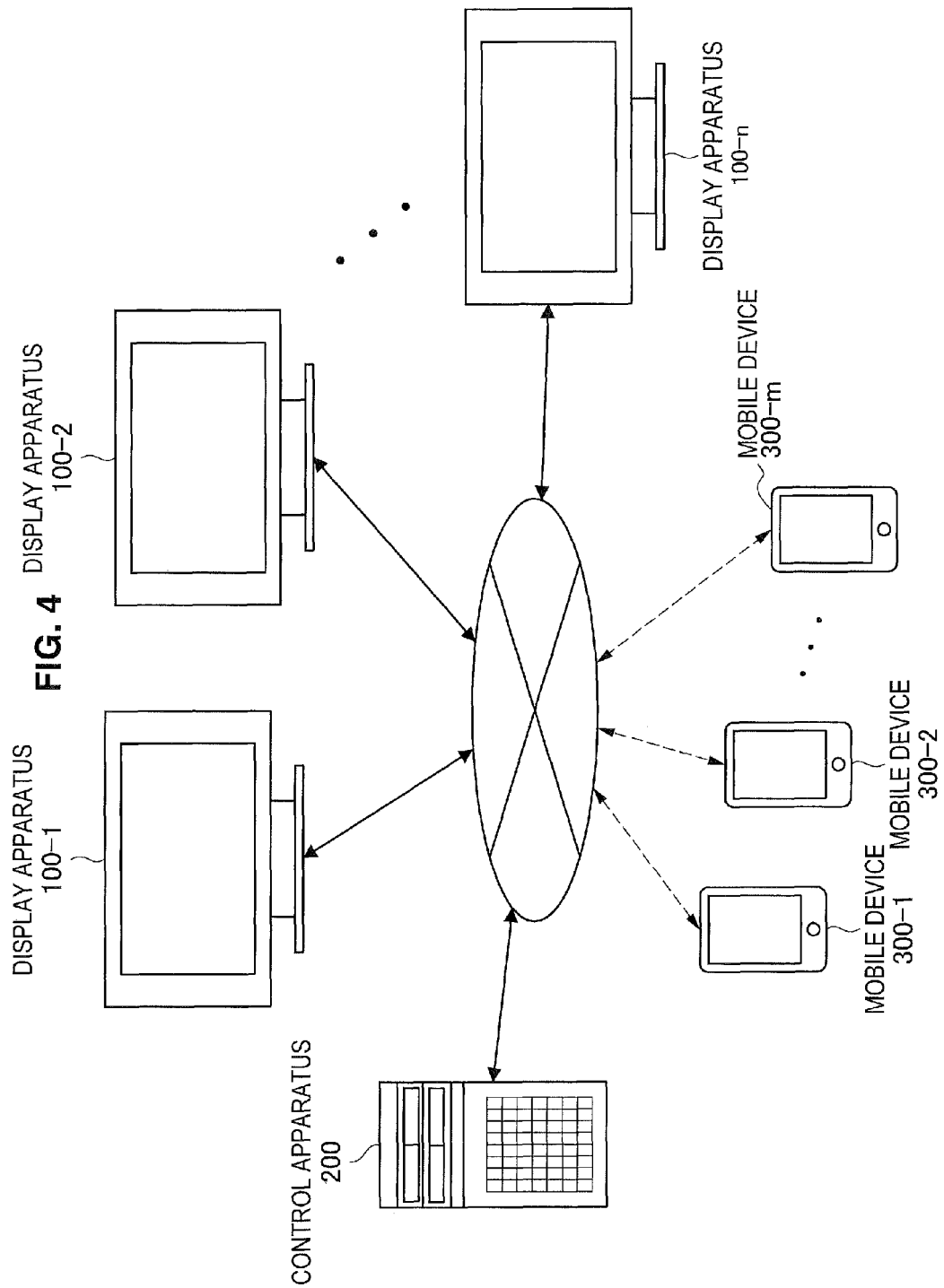

FIG. 4 is an external view showing the device cooperation system 10. In the present embodiment, one or a plurality of display apparatuses 100-1, 100-2, . . . , 100-n is installed at a site with some spread. One or a plurality of users is present at the site. Each of the users carries mobile devices 300-1, 300-2, . . . , 300-m.

Three of the display apparatus 100-n, the mobile device 300-m, and the control apparatus 200 are connected via a network. The control apparatus 200 manages the display apparatus 100-n and the mobile device 300-m. The display apparatus 100-n and the control apparatus 200 are wire-connected. The mobile device 300-m and the control apparatus 200 are wirelessly connected.

Herein, a case when a plurality of the display apparatuses 100 and a plurality of the mobile devices 300 are present will mainly be described. The number of one or both of the display apparatus 100-n and the mobile device 300-m may be one. Also herein, when any one of the display apparatuses 100-1, 100-2, . . . , 100-n is represented, the display apparatus is denoted simply as the display apparatus 100. Also, when any one of the mobile devices 300-1, 300-2, . . . , 300-m is represented, the mobile device is denoted simply as the mobile device 300.

Figure 5:
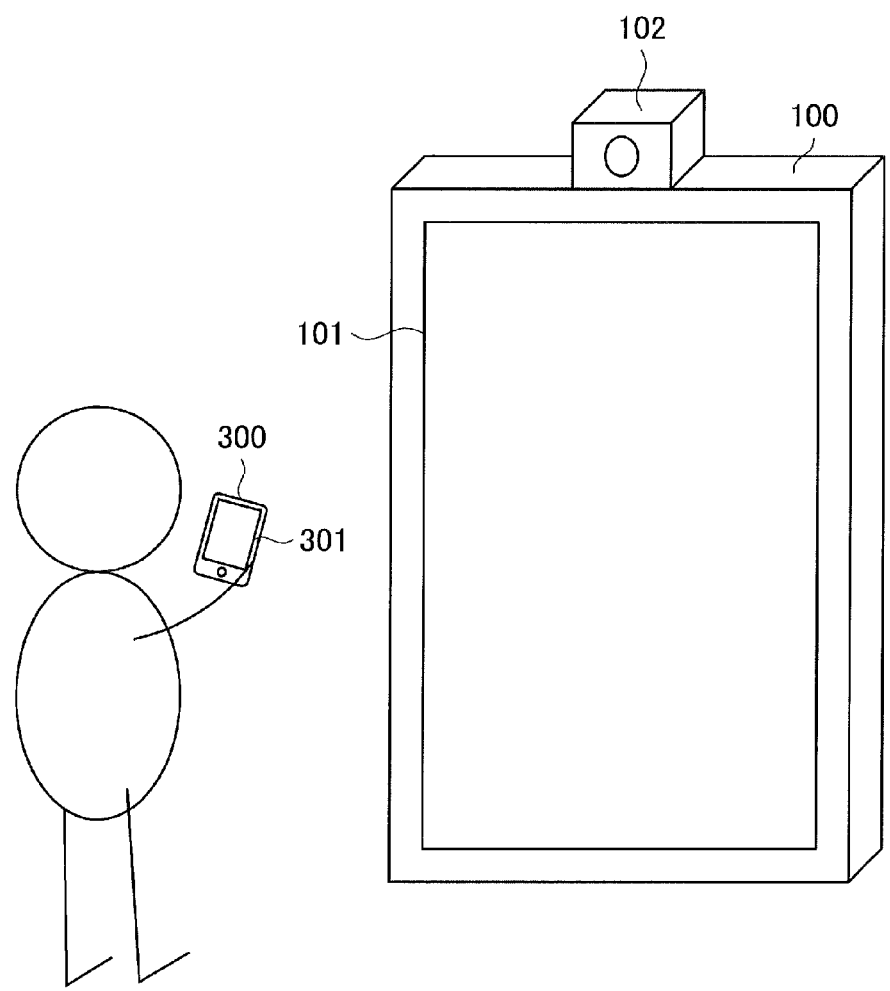

FIG. 5 is an external view showing the display apparatus 100 and the control apparatus 300. The display apparatus 100 includes the LCD 101 to display information such as advertisements in a forward direction and the sensor value acquisition unit 102 such as a camera in the upper part thereof. The sensor value acquisition unit 102 is arranged in the forward direction. The sensor value acquisition unit 102 images or senses a subject opposite to the display surface. The display unit 301 of the mobile device 300 may be a large touch panel.

When the user desires communication between the mobile device 300 of the user and one of the display apparatuses 100, the user makes a predetermined motion. The sensor value acquisition unit 102 of the display apparatus 100 and the sensor value acquisition unit 302 of the mobile device 300 detect the motion of the same user. The display apparatus 100 and the mobile device 300 transmit respective detection results to the control apparatus. The control apparatus 200 compares received detection results to decide the combination of the display apparatus 100 and the mobile device 300.

Figure 6:
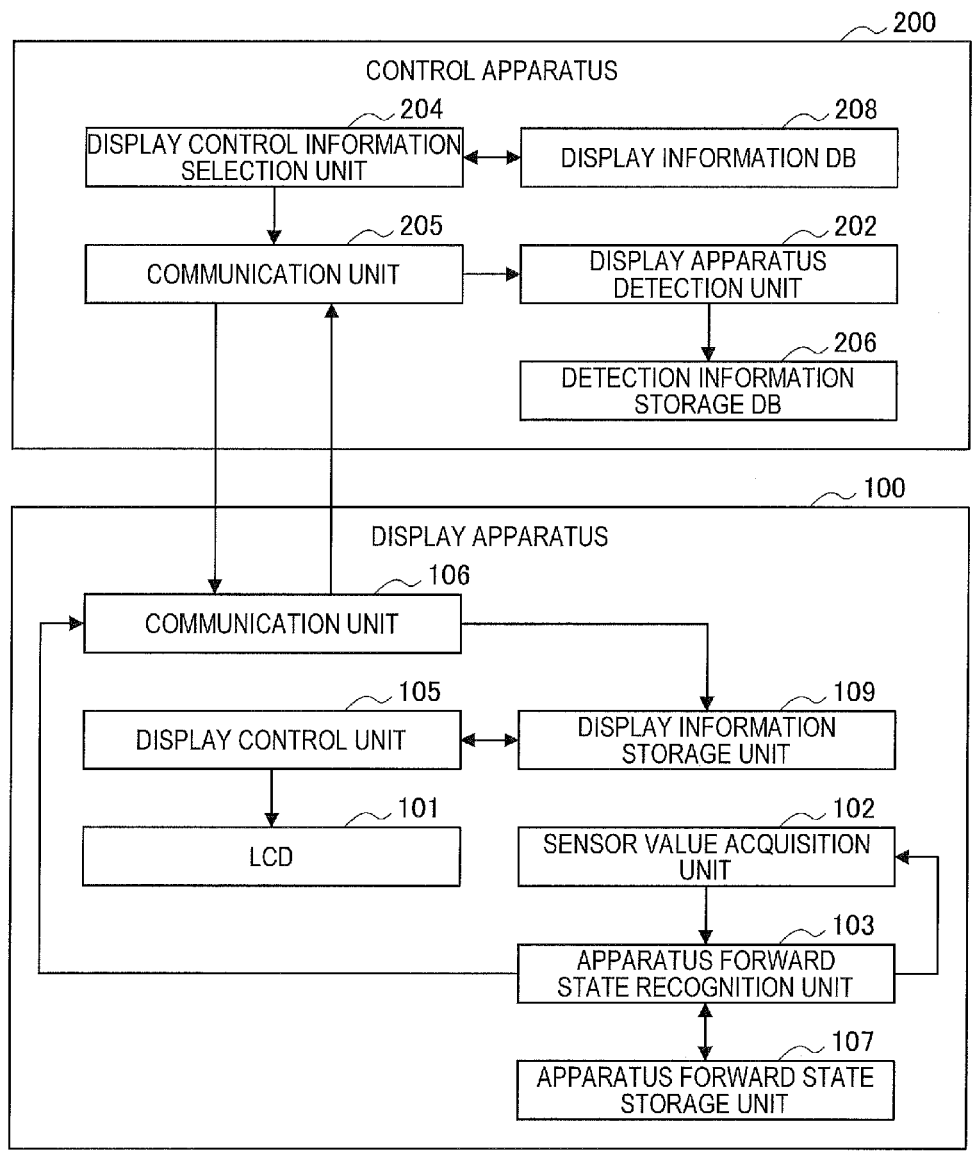
Figure 7:
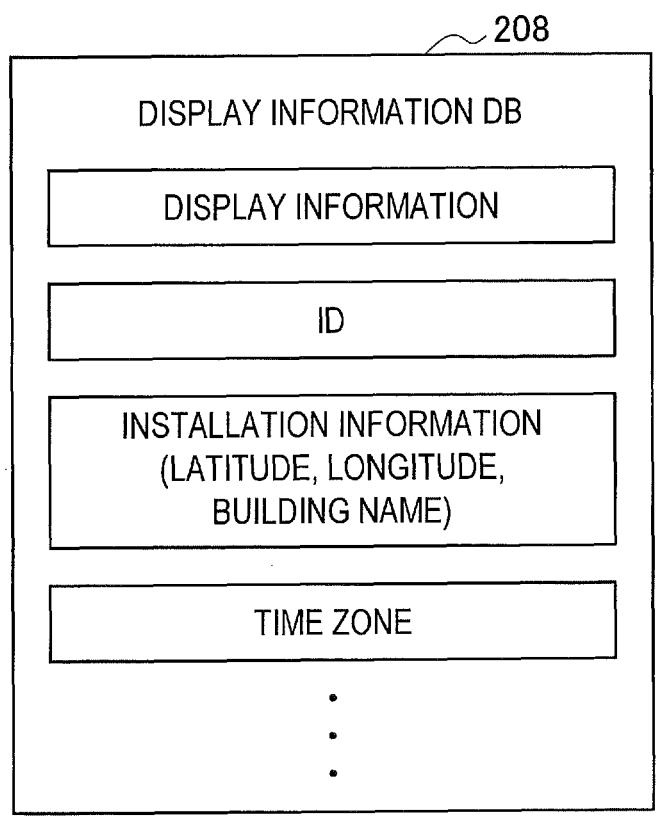

FIG. 6 is a diagram showing the function configuration of a cooperation between the display apparatus and the control apparatus. FIG. 7 is a diagram showing an example of a display information DB (database) 208.

The display information DB 208 holds display information 401 (advertising data and so on), IDs 402, installation information 403 (such as the latitude, longitude, and building name) of display apparatuses, and information 404 such as periods and time zones.

Display control processing from the control apparatus 200 to the display apparatus 100 will be described by using FIG. 6.

The display control information selection unit 204 of the control apparatus 200 reads the display information 401 from the display information DB 208. The display information 401 is, for example, image data in still image format. The image data in still image format is image data to be displayed in the display apparatus 100. The display control information selection unit 204 uniquely or randomly selects the display information 401 to be displayed by a predetermined method from the read display information. The predetermined method is determined by the installation location (such as the latitude, longitude, and building name) of the display apparatus 100 whose display should be controlled and information such as periods and time zones. The display control information selection unit 204 outputs the selected display information to the communication unit 205 of the control apparatus 200.

The communication unit 205 transmits the display information selected by the display control information selection unit 204 to the communication unit 106 of the display apparatus. The communication unit 205 operates also as a receiving unit that receives a sensor detection result from the communication unit 106.

The communication unit 106 of the display apparatus 100 stores the display information received from the communication unit 205 in the display information storage unit 109 of the display apparatus.

The display information storage unit 109 is a memory or the like to store display information.

The display control unit 105 of the display apparatus 100 exercises control to read display information from the display information storage unit 109 and to display the display information in the LCD 101.

The LCD 101 shows the display information under the control of the display control unit 105.

Next, processing to transmit a state in front of the display apparatus 100 to the control apparatus 200 by the display apparatus 100 will be described.

The sensor value acquisition unit 102 contains one or a plurality of sensors. The sensor value acquisition unit 102 acquires information about the state in front of the display apparatus.

The one sensor value acquisition unit 102 may be shared by a plurality of the display apparatuses 100. In this case, data acquired by the sensor value acquisition unit 102 is divided for each region corresponding to each of the sharing display apparatuses 100. If, for example, acquired data is image data, the image data is divided into individually associated regions and each of the display apparatuses 100 uses each piece of the divided image data for processing. If acquired data is data other than image data, instead of dividing the acquired data itself, a portion of the data corresponding to each region is used to perform processing.

The sensor value acquisition unit 102 outputs the acquired data to the apparatus forward state recognition unit 103.

The sensor value acquisition unit 102 is configured by, for example, a depth sensor, video acquisition sensor, infrared sensor, ultrasonic sensor or the like. The acquired data is, for example, the value of distance to a user in front of the display apparatus or depth image data. The acquired data may also be a data sequence comprising a plurality of values of distance.

In the present embodiment, the sensor value acquisition unit 102 is a depth sensor. The acquired data includes distance image data (image data in which depth information is represented by half-toning or the like) and a data sequence thereof. Information acquired by the sensor value acquisition unit 102 is not limited to information about the state in front of the display apparatus 100. Information acquired by the sensor value acquisition unit 102 may be information about the periphery of the display apparatus 100, for example, the rear, the left, or the right thereof.

When acquired information is input by the sensor value acquisition unit 102, the apparatus forward state recognition unit 103 temporarily stores the input acquired data in the apparatus forward state storage unit 107. The apparatus forward state recognition unit 103 detects a specific motion of a user in front of the display apparatus 100 from the acquired data sequence temporarily stored in the apparatus forward state storage unit 107.

Acquired data sequence process processing by the apparatus forward state recognition unit 103 will be described with reference to FIG. 8. An example of processing in which the apparatus forward state recognition unit 103 processes the acquired data sequence temporarily stored in the apparatus forward state storage unit 107 to detect a specific motion of a user in front of the display apparatus will be described.

Figure 8:
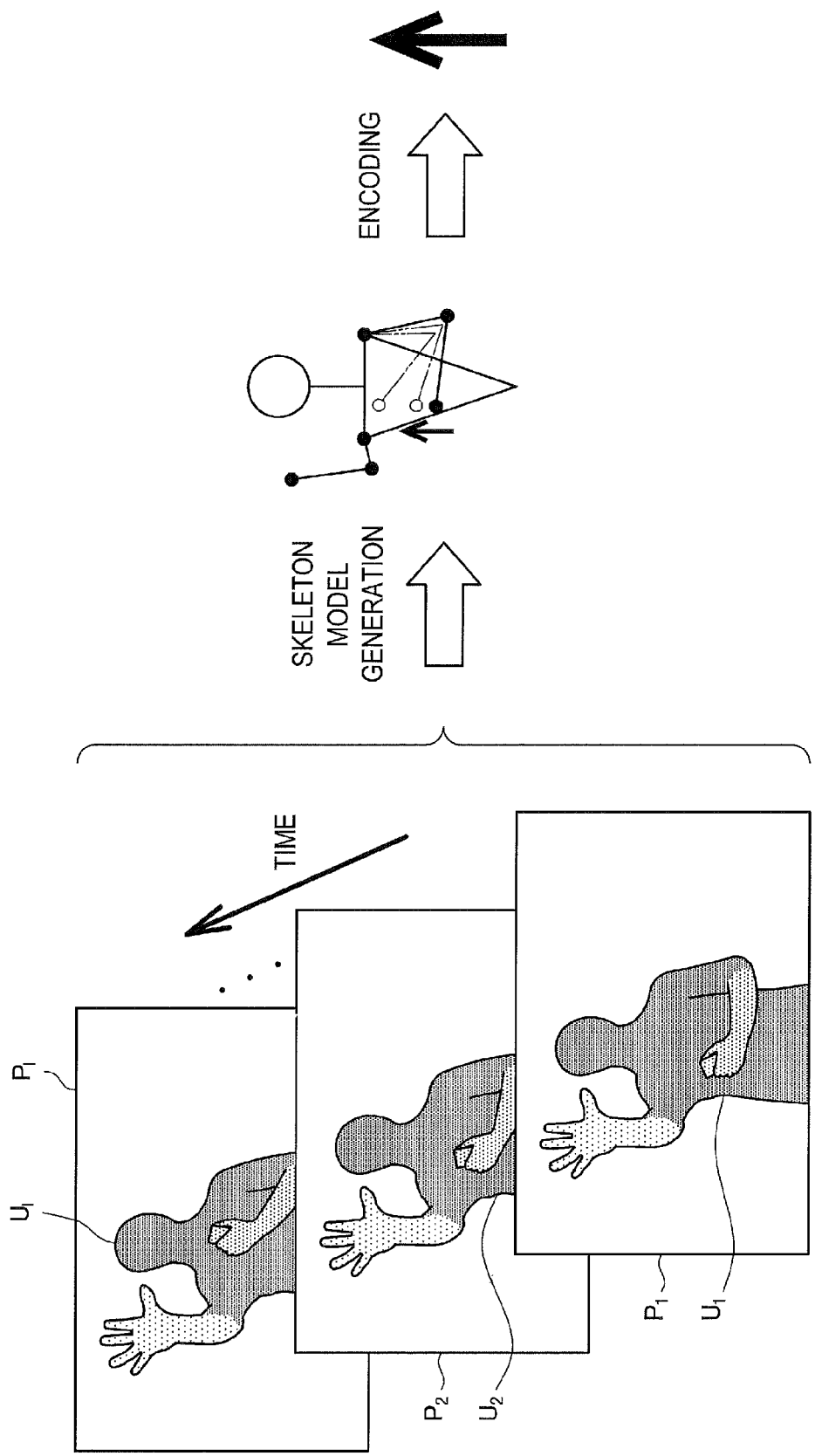

As shown in FIG. 8, the acquired data sequence is, for example, a sequence a plurality of pieces of distance image data (P1, P2, . . . , P1) imaged successively. Each piece of the distance image data P1, P2, . . . , P1 contains portions U1, U2, . . . , U1 assumed to be an imaged user.

The apparatus forward state recognition unit 103 generates a skeleton model U of the user from the acquired data sequence to calculate a displacement of each of regions of the user. For example, as shown in FIG. 8, the apparatus forward state recognition unit 103 calculates the displacement of the position of the user's left hand. Distance image data containing depth information is used in this example and thus, the apparatus forward state recognition unit 103 can detect a three-dimensional motion of the user including the depth direction. Therefore, the skeleton model U representing the three-dimensional motion of the skeleton and each region of the user can be obtained.

If the displacement of a specific region of the user, for example, the left hand is equal to a predetermined value or more in a predetermined direction, the apparatus forward state recognition unit 103 detects that the user has made a specific motion and encodes an acquired data sequence. The apparatus forward state recognition unit 103 encodes an acquired data sequence if the motion of the user matches, for example, one of four labels of upward, downward, leftward, and rightward. In FIG. 8, the apparatus forward state recognition unit 103 determines that the displacement of the position of the user's left hand in the skeleton model U is upward and encodes the acquired data sequence by using the upward label.

If it is determined that the displacement of a specific region of the user, for example, the left hand is not equal to a predetermined value or more in a predetermined direction, the apparatus forward state recognition unit 103 detects that the user does not make a specific motion. The apparatus forward state recognition unit 103 controls the sensor value acquisition unit 102 to continue the acquisition of sensor values. In this case, the apparatus forward state recognition unit 103 may overwrite acquired data stored in the apparatus forward state storage unit 107 with acquired data newly acquired by the sensor value acquisition unit 102. The storage area of the apparatus forward state storage unit 107 can thereby be saved.

If a specific motion of the user is detected, the apparatus forward state recognition unit 103 outputs the detection result (for example, one of the four labels of upward, downward, leftward, and rightward) to the communication unit 106. On the other hand, if no specific motion of the user is detected by the apparatus forward state recognition unit 103, the processing performed by the sensor value acquisition unit 102 and the processing performed by the apparatus forward state recognition unit 103 will repeatedly be performed until the system is terminated.

The communication unit 106 transmits the input detection result to the communication unit 205 of the control apparatus 200 as detection information.

The communication unit 205 of the control apparatus receives detection information of the display apparatus 100 and outputs the detection information to the display apparatus detection unit 202.

The display apparatus detection unit 202 stores the input detection information in the detection information storage DB 206.

Figure 9:
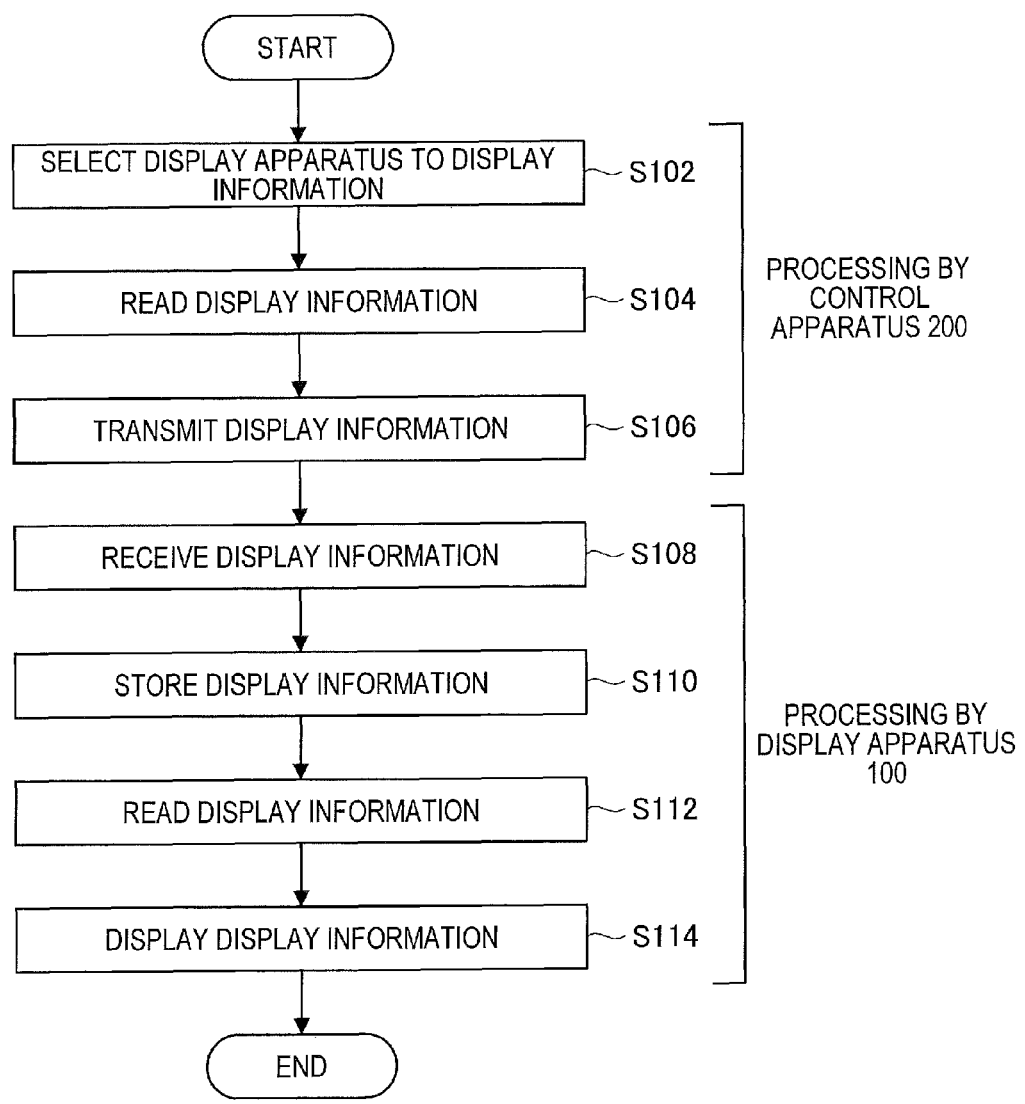

FIG. 9 is a flow diagram showing an example of the flow of display control processing. The display control processing performed by the display apparatus 100 and the control apparatus 200 will be described according to FIG. 9.

The display control information selection unit 204 of the control apparatus 200 selects the display apparatus 100 that shows information (S102).

The display control information selection unit 204 reads the display information 401 from the display information DB 208 and outputs the read display information 401 to the communication unit 205 (S104).

The communication unit 205 transmits the display information 401 input by the display control information selection unit 204 to the communication unit 106 of the display apparatus 100 (S106).

The communication unit 106 of the display apparatus receives the display information 401 (S108).

The display information storage unit 109 stores the received display information 401 (S110).

The display control unit 105 reads the display information 401 from the display information storage unit 109 of the display apparatus (S112).

The display control unit 105 exercises control to display the read display information 401 in the LCD 101. (S114).

Figure 10:
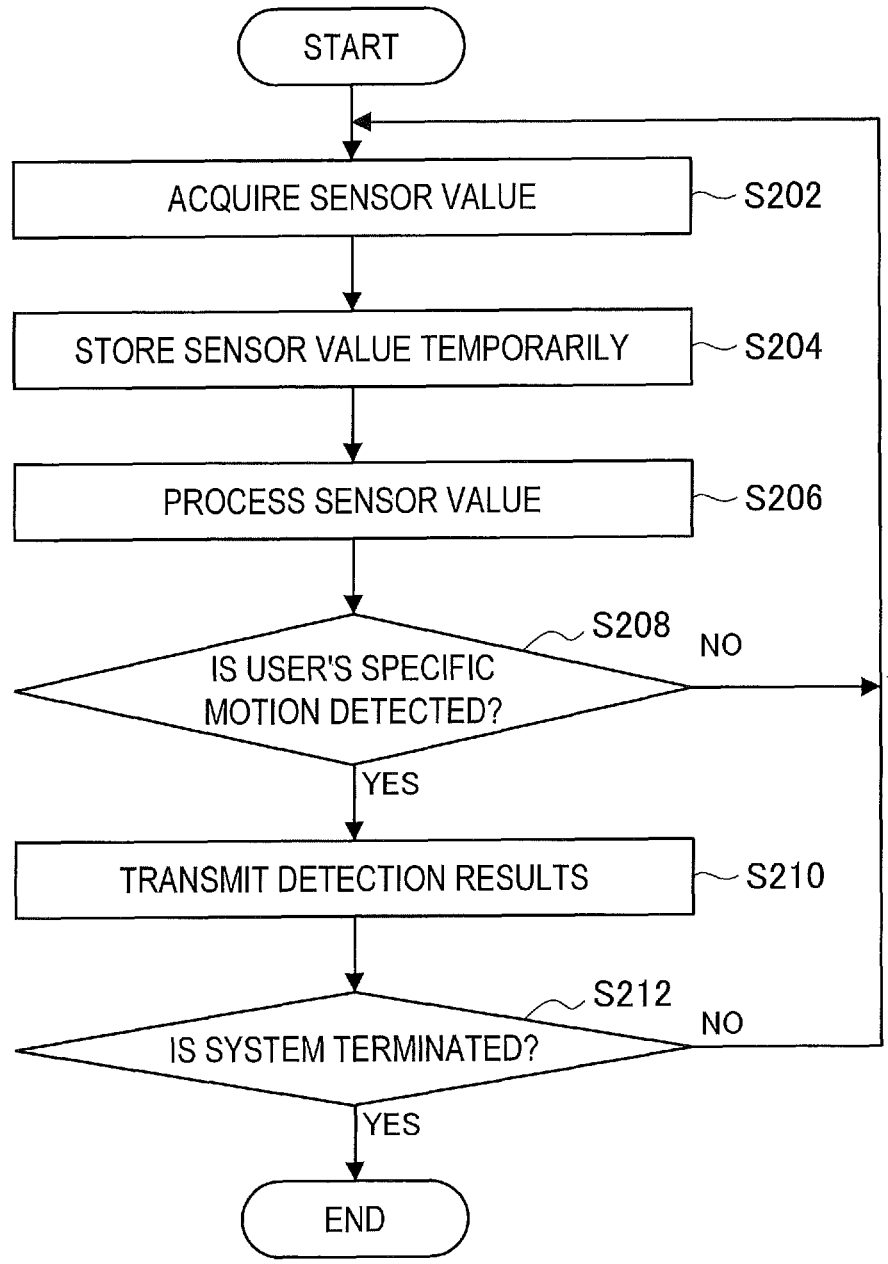

FIG. 10 is a flow diagram showing an example of the flow of user's motion detection and detection result transmission to the control apparatus 200 performed by the display apparatus 100. The flow of user's motion detection and detection result transmission to the control apparatus 200 performed by the display apparatus 100 will be described by using FIG. 10.

The sensor value acquisition unit 102 of the display apparatus 100 acquires information about the state in front of the display apparatus 100 and outputs the information to the apparatus forward state recognition unit 103 (S202).

The apparatus forward state recognition unit 103 causes the apparatus forward state storage unit 107 to temporarily store acquired data input by the sensor value acquisition unit 102 by accumulating the data therein (S204).

The apparatus forward state recognition unit 103 reads an acquired data sequence from the apparatus forward state storage unit 107 to process the read acquired data sequence (S206). For example, as illustrated in FIG. 8, the apparatus forward state recognition unit 103 represents a user's motion by code.

The apparatus forward state recognition unit 103 determines whether a specific motion of the user is detected (S208). If a specific motion of the user is detected, the apparatus forward state recognition unit 103 advances the processing to step S210. If no predetermined motion of the user is detected, the apparatus forward state recognition unit 103 brings the processing back to step S202.

The apparatus forward state recognition unit 103 outputs detection information of a specific motion of the user to the communication unit 106. The communication unit 106 of the display apparatus 100 transmits the input detection result to the communication unit 205 of the control apparatus (S210).

The above processing is repeatedly performed until the system is terminated (S212).

Figure 11:
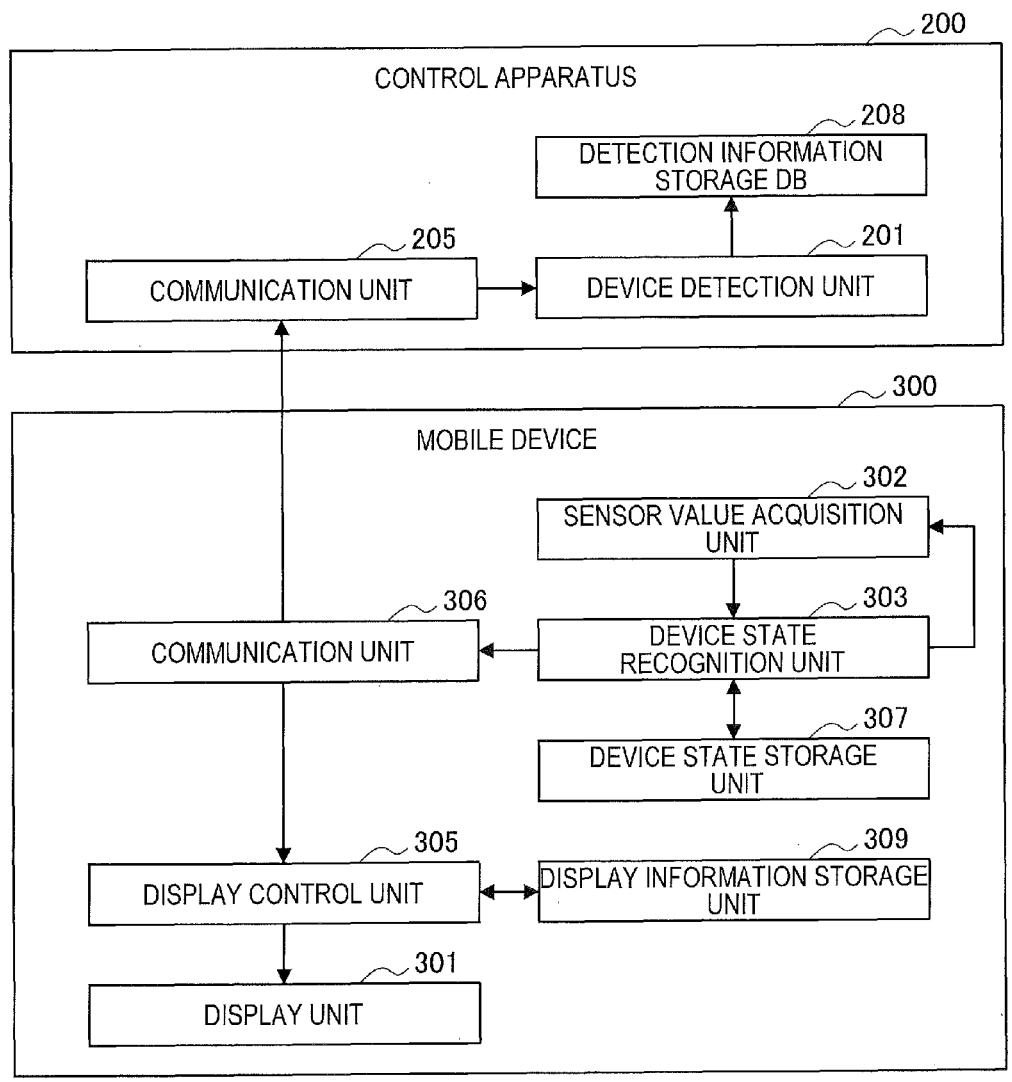

FIG. 11 is a diagram showing the configuration regarding cooperation processing between the control apparatus 200 and the mobile device 300. The cooperation processing between the control apparatus 200 and the mobile device 300 will be described below.

After the control apparatus 200 and the mobile device 300 being connected to a network by wireless connection or the like, the display control unit 305 makes a display stored in the display information storage unit 309 in advance and requesting a predetermined motion from the user in the display unit 301. For example, the display control unit 305 makes a display requesting to user to move the mobile device 300 upward in the display unit 301.

The sensor value acquisition unit 302 of the mobile device 300 contains one or a plurality of sensors. The sensor value acquisition unit 302 acquires information about the state of the mobile device as acquired data. The sensor value acquisition unit 302 outputs acquired data described later to the device state recognition unit 303.

The sensor value acquisition unit 302 is comprised of an orientation sensor, acceleration sensor, image sensor such as a camera, infrared sensor or the like. The acquired data is, for example, vector data in a gravity direction by an acceleration sensor or distance data up to a forward object by an infrared sensor. In the present embodiment, the sensor value acquisition unit 302 includes an acceleration sensor to detect acceleration in the left and right direction (x-axis direction) and an acceleration sensor to detect acceleration in the up and down direction (z-axis direction). Acquired data contains time series data of the acceleration sensor in the x-axis direction and time series data of the acceleration sensor in the z-axis direction. In the present embodiment, the up and down direction is the vertical direction and down is the downward direction in the vertical direction. The left and right direction is a direction perpendicular to the vertical direction and the left direction is a positive direction and the right direction is a negative direction.

Figure 12:
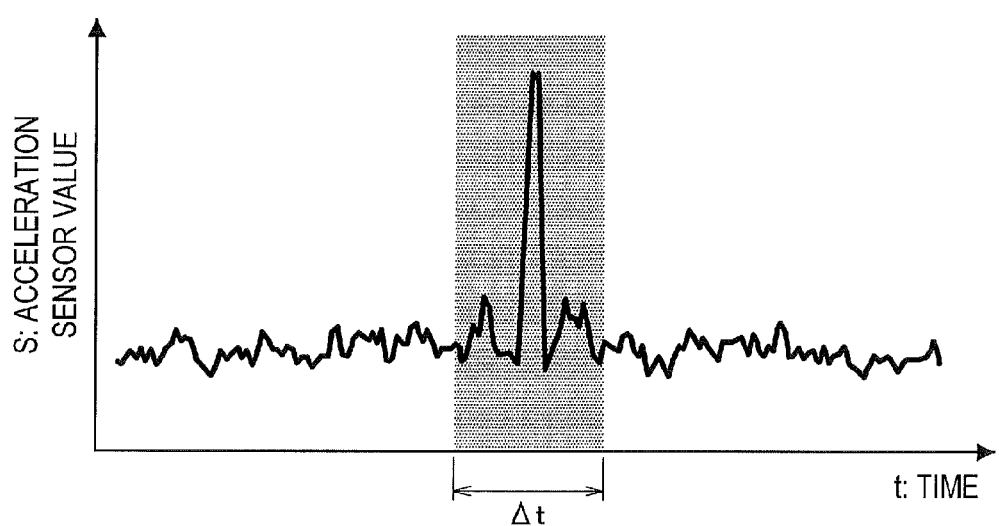

FIG. 12 is a diagram showing an example of time series data in a direction in which an acceleration sensor is located. The device state recognition unit 303 determines whether any sensor value equal to a predetermined threshold or more in a predetermined time is detected from acquired data input by the sensor value acquisition unit 302 in one or a plurality of directions. If no sensor value equal to a predetermined threshold or more in a predetermined time is detected (in other words, the action of the mobile device 300 is small), the device state recognition unit 303 does the following action. The control by the device state recognition unit 303 to make a display requesting a predetermined motion from the user in the display unit 301 and the acquisition of sensor values by the sensor value acquisition unit 302 are repeated until a sensor value equal to a predetermined threshold or more is detected in a predetermined time or the system is terminated.

On the other hand, if a sensor value equal to a predetermined threshold or more is detected in a predetermined time in one or a plurality of directions (FIG. 12), the device state recognition unit 303 temporarily stores the sensor value as acquired data in the device state storage unit 307. For example, the device state recognition unit 303 temporarily stores the time and duration when a peak occurs and the acceleration sensor value in a peak position. The device state recognition unit 303 reads a stored acquired data sequence from the device state storage unit 307 to process the data. The data processing is, for example, encoding by using one of four labels of upward, downward, leftward, and rightward.

The device state recognition unit 303 encodes acquired data by using the leftward label if the sensor value in the x-axis direction is in the positive direction, the size thereof is equal to a predetermined threshold or more, and the size of the sensor value in the z-axis direction is equal to a predetermined threshold or less. It is assumed that a leftward motion of the user is detected.

If it is difficult to encode acquired data by using a label corresponding to one direction such as when both sizes of sensor values in the x-axis direction and z-axis direction of acquired data are equal to thresholds or more, the device state recognition unit 303 determines that it is difficult to detect a specific motion of the user. The device state recognition unit 303 can also exercise control to display an error message that no motion is detected and a message to request to user to make a predetermined motion again in the display unit 301.

If a motion in a specific direction of the user is detected and acquired data is encoded by using a label, the device state recognition unit 303 outputs a detection result containing detection information data obtained by encoding the acquired data, a time stamp as information of the time when the acquired data is acquired, and a mobile device ID to identify the mobile device 300 to the communication unit 306.

The communication unit 306 transmits the detection result to the display control unit 305 and the communication unit 205 of the control apparatus 200.

When the detection result is input into the display control unit 305, the display control unit 305 reads display information corresponding to the detection result stored beforehand in the display information storage unit 309. The display control unit 305 shows the display information in the display unit 301. For example, visual feedback that the motion of a user carrying a mobile device has been detected is displayed in the display unit 301 as display information corresponding to the detection result. The display control unit 305 may display the detection result in the display unit 301 together with the visual feedback. The display control unit 305 may also reproduce specific voice, music, vibration or the like as feedback that the user's motion has been detected.

The communication unit 205 of the control apparatus 200 outputs the detection result received from the communication unit 306 of the mobile device 300 to the device detection unit 201.

The device detection unit 201 stores the input detection result in the detection information storage DB 206.

Figure 13:
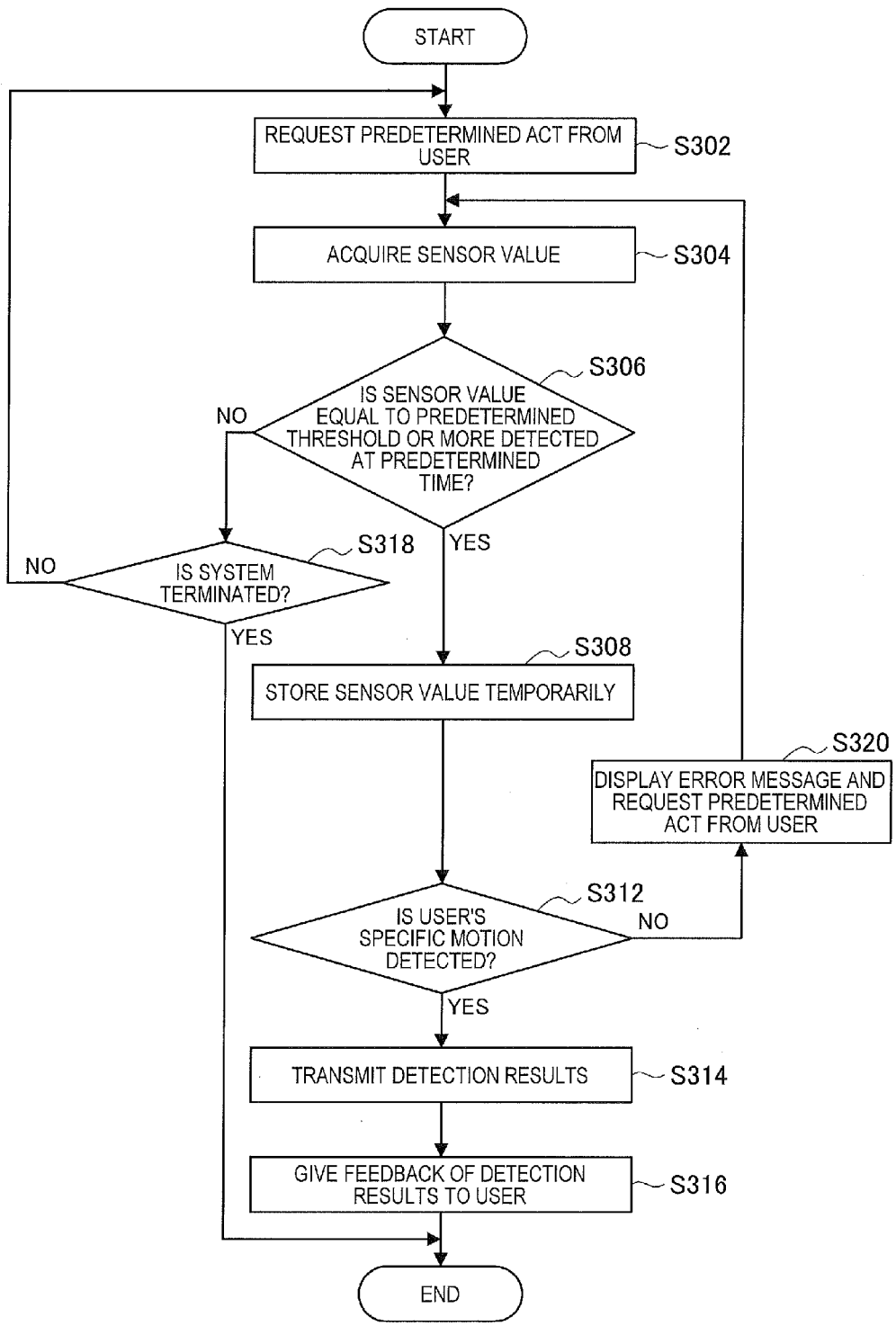

FIG. 13 is a diagram showing the flow of user's motion detection processing and detection result transmission processing to the control apparatus 200 performed by the mobile device 300. User's motion detection processing and detection result transmission processing to the control apparatus 200 by the mobile device 300 will be described with reference to FIG. 13. It is assumed that the control apparatus 200 and the mobile device 300 are connected.

After the control apparatus 200 and the mobile device 300 being connected to a network by wireless connection or the like, the display control unit 305 makes a display stored in the display information storage unit 309 in advance and requesting a predetermined motion from the user in the display unit 301 (S302).

The sensor value acquisition unit 302 acquires information about a motion state of the mobile device 300 obtained as a result of a user's motion and outputs the information to the device state recognition unit 303 (S304).

The device state recognition unit 303 analyzes the acquired data input by the sensor value acquisition unit 302. The device state recognition unit 303 determines whether any sensor value equal to a predetermined threshold or more in a predetermined time is detected in one or a plurality of directions (S306). If a sensor value equal to a predetermined threshold or more is detected in a predetermined time, the device state recognition unit 303 advances the processing to step S308. On the other hand, if a sensor value equal to a predetermined threshold or more is not detected in a predetermined time, the device state recognition unit 303 advances the processing to step S318.

When the processing is advanced to step S308, the device state recognition unit 303 temporarily stores the sensor value as acquired data in the device state storage unit 307 (S308).

The device state recognition unit 303 reads a stored acquired data sequence from the device state storage unit 307 to determine whether a predetermined motion of the user is detected (S312). If a predetermined motion of the user is detected, the device state recognition unit 303 advances the processing to step S314. If no predetermined motion of the user is detected, the device state recognition unit 303 advances the processing to step S320.

If, in step S312, the processing is advanced to step S314, the device state recognition unit 303 outputs a detection result to the display control unit 305 and the communication unit 306. When a detection result is input by the device state recognition unit 303, the communication unit 306 outputs the detection result to the communication unit 205 of the control apparatus 200 (S314).

When a detection result is input by the device state recognition unit 303, the display control unit 305 makes a display what a user's motion has been detected in the display unit 301 before terminating the processing (S316).

If, in step S306, the processing is advanced to step S318, the device state recognition unit 303 repeats the processing by returning to step S302 until the system is terminated (S318).

If, in step S312, the processing is advanced to step S320, the device state recognition unit 303 exercises control to makes a display of an error message and a display to request the user to make a predetermined motion in the display unit 301 (S320).

Figure 14:
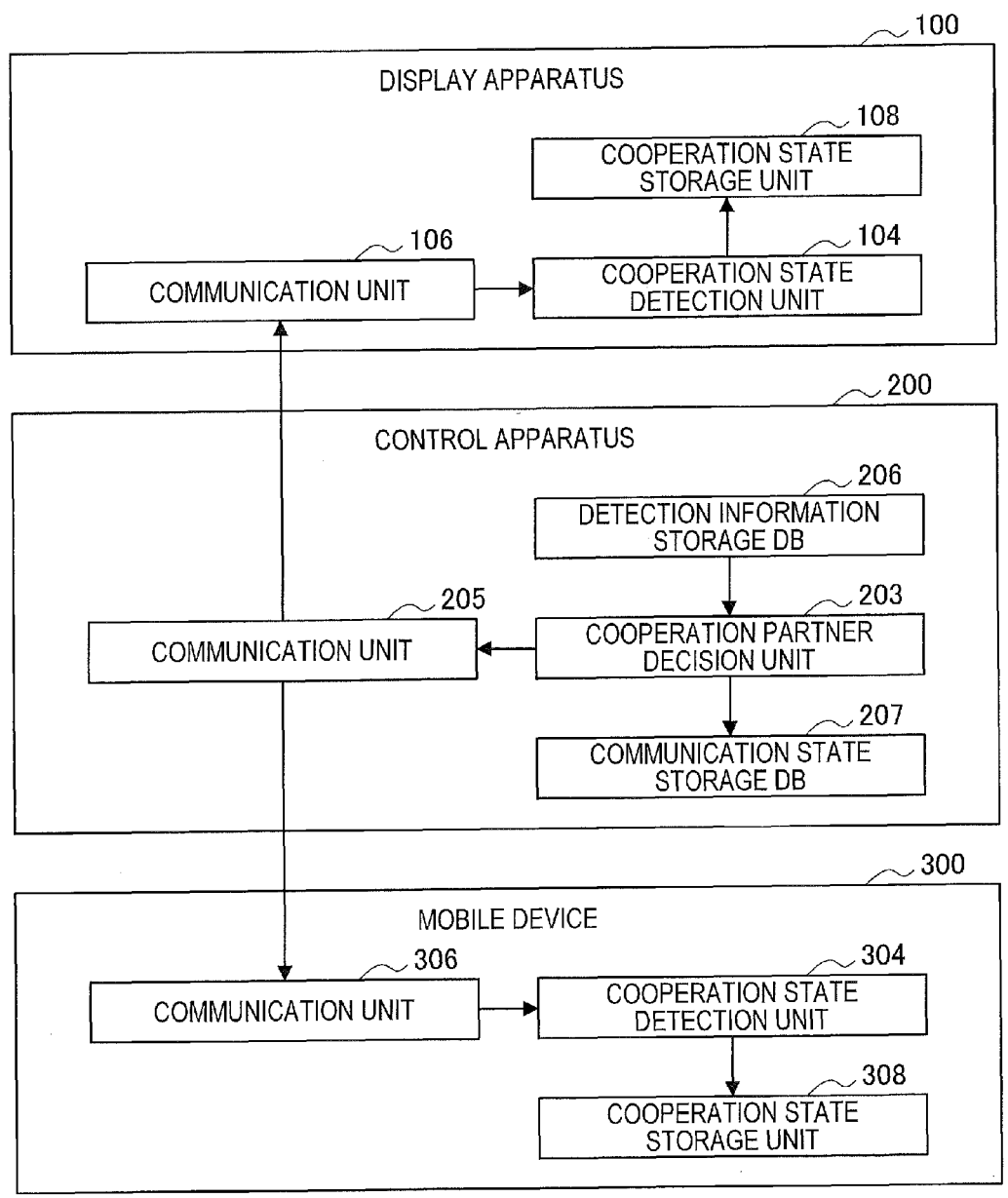
Figure 15:
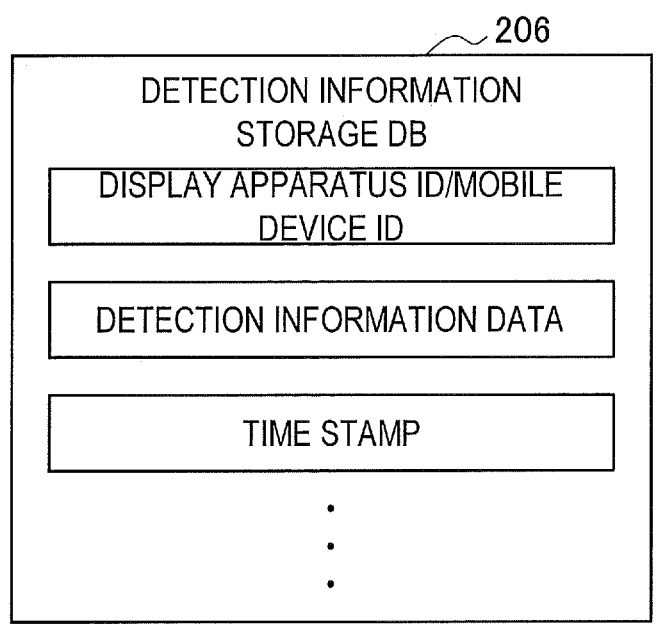

FIG. 14 is a diagram showing a portion of the function configuration of the display apparatus 100, the control apparatus 200, and the mobile device 300. Cooperation processing between the display apparatus 100 and the mobile device 300 and cooperation partner information notification processing performed by the control apparatus 200 will be described with reference to FIGS. 14 to 17. FIG. 15 is a diagram showing an example of the detection information storage DB 206.

The detection information storage DB 206 at least contains, as shown in FIG. 15, a display apparatus ID or mobile device ID 411, detection information 412 obtained by encoding a user's motion, and a time stamp 413 as time information when a user's motion is detected.

The cooperation partner decision unit 203 reads a detection result from the detection information storage DB 206. Based on the read detection result, the cooperation partner decision unit 203 decides a pair of the display apparatus 100 and the mobile device 300 from the display apparatuses 100-1, 100-2, . . . , 100-*n* and the mobile devices 300-1, 300-2, . . . , 300-*m*.

Figure 16:
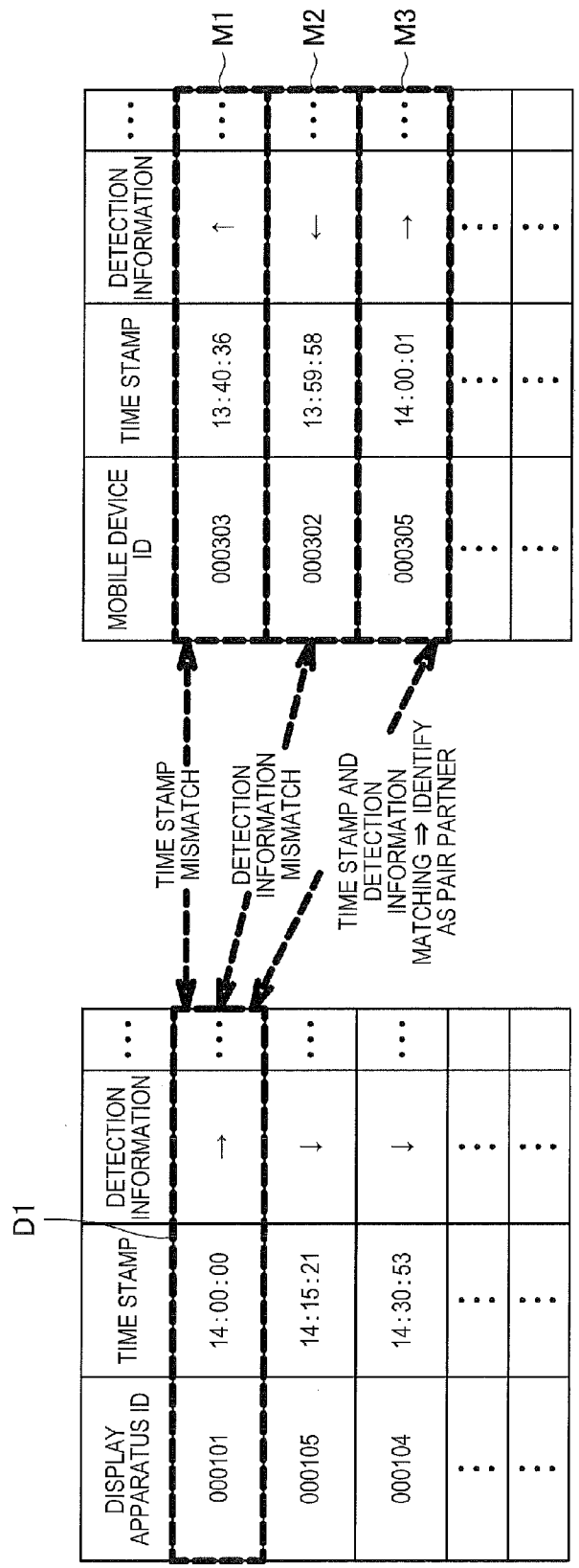

FIG. 16 is a diagram illustrating cooperation partner decision processing between the display apparatus 100 and the mobile device 300 performed by the cooperation partner decision unit 203. Detection results detected by the display apparatus 100 of information stored in the detection information storage DB 206 are shown on the left side of FIG. 16 and detection results detected by the mobile devices 300 are shown on the right side of FIG. 16.

The cooperation partner decision unit 203 compares each detection result detected by the display apparatus 100 and each detection result detected by the mobile device 300. As an example of the comparison method, the cooperation partner decision unit 203 compares the time stamp of the display apparatus 100 and the time stamp of the mobile device 300. If the difference between time stamps is equal to a predetermined threshold or less, the cooperation partner decision unit 203 further compares detection information of the display apparatus 100 and detection information of the mobile device 300.

If detection information of the display apparatus 100 and detection information of the mobile device 300 match, the cooperation partner decision unit 203 decides the display apparatus 100 and the mobile device 300 as a pair. The reason that the cooperation partner decision unit 203 makes such a determination is as follows. If the user carrying the mobile device 300 makes a predetermined motion in front of the display apparatus 100 to gain the cooperation between the mobile device 300 and the display apparatus 100, it is assumed that the time stamp and detection information (such as upward or downward) of the display apparatus 100 and the time stamp and detection information (such as upward or downward) of the mobile device 300 match.

In FIG. 16, if a detection result D1 of the display apparatus 100-1 (display apparatus ID: 000101) and a detection result M1 of the mobile device 300-3 (mobile device ID: 000303) are compared, the time stamps do not match. The cooperation partner decision unit 203 does not pair the display apparatus 100-1 and the mobile device 300-3.

If the detection result D1 of the display apparatus 100-1 (display apparatus ID: 000101) and a detection result M2 of the mobile device 300-2 (mobile device ID: 000302) are compared, the time stamps match. However, while the detection information of the display apparatus 100 is "downward", the detection information of the mobile device 300 is "leftward" and both pieces of the detection information do not match. The cooperation partner decision unit 203 does not pair the display apparatus 100-1 and the mobile device 300-2.

If the detection result D1 of the display apparatus 100-1 (display apparatus ID: 000101) and a detection result M3 of the mobile device 300-5 (mobile device ID: 000305) are compared, the time stamps and detection information match. In this case, the cooperation partner decision unit 203 pairs the display apparatus 100-1 and the mobile device 300-5.

The cooperation partner decision unit 203 may decide only pairs of the display apparatus 100 and the mobile device 300 having a plurality of detection results in which the difference of time stamps is equal to a threshold or less and both pieces of detection information match as cooperation partners. As a result, accidental establishment of cooperation between the mobile device 300 carried by the user and the display apparatus 100 detecting the user's motion is prevented when the user makes a predetermined motion unintendedly.

When a pair of the display apparatus 100 and the mobile device 300 is identified, the cooperation partner decision unit 203 causes the cooperation state storage DB 207 to store the ID of the display apparatus 100, the ID of the mobile device 300, and the time stamp and also outputs the IDs and time stamp to the display control information selection unit 204.

Figure 17:
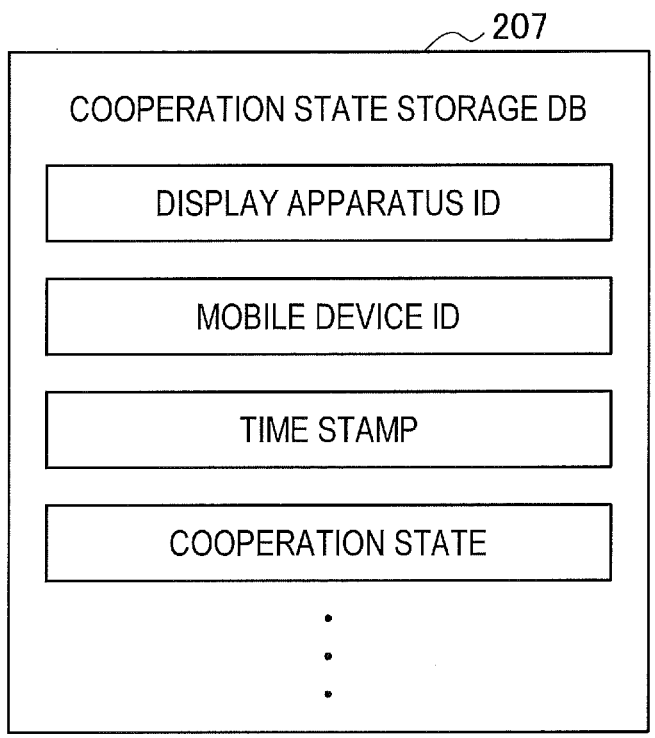

FIG. 17 is a diagram showing an example of the cooperation state storage DB 207. The cooperation state storage DB 207 stores a display apparatus ID 421 of the display apparatus 100 to be paired, a mobile device ID 422 of the mobile device 300, a time stamp 423, and a cooperation state 424 between the display apparatus and mobile device.

Information stored in the cooperation state storage DB 207 is used when, for example, the number of times of visual recognition of advertisements by the user is recorded.

The cooperation partner decision unit 203 in FIG. 14 outputs information about cooperation partners for the display apparatus 100 and the mobile device 300 to the communication unit 205.

The display control information selection unit 204 reads the display information 401 to be displayed in each of the display apparatus 100 and the mobile device 300 from the display information DB 208 and outputs the display information 401 to the communication unit 205. For example, in addition to advertisements normally displayed in the display apparatus 100, a point cursor in accordance with the action of the mobile device 300 as a cooperation partner is displayed. Information about display information such as advertisements displayed when the user makes a specific motion in front of the display apparatus 100 as a cooperation partner is displayed in the mobile device 300.

The communication unit 205 transmits information about the mobile device 300 to be a cooperation partner of the display apparatus 100, for example, the mobile device ID 422 of the mobile device 300 and the display information 401 to be displayed in the display apparatus 100 to the communication unit 106 of the display apparatus 100.

The communication unit 205 transmits information about the display apparatus 100 to be a cooperation partner of the mobile device 300, for example, the display apparatus ID 421 of the display apparatus 100 and display information to be displayed in the mobile device 300 to the communication unit 306 of the mobile device.

The communication unit 106 of the display apparatus 100 receives cooperation partner information from the communication unit 205 of the control apparatus. The communication unit 106 outputs the cooperation partner information to the cooperation state detection unit 104. When the display information 401 is received from the communication unit 205 of the control apparatus 200, the communication unit 106 stores the display information 401 in the display information storage unit 109.

When cooperation partner information is input, the cooperation state detection unit 104 causes the cooperation state storage unit 108 to store the cooperation partner information.

The cooperation partner information is used, for example, as an identifier to identify, among a plurality of the mobile device 300 present in a network of the device cooperation system 10, the mobile device 300 as a cooperation partner of the display apparatus 100.

The display control unit 105 reads the display information 401 corresponding to the mobile device 300 as a cooperation partner from the display information storage unit 109 and shows the display information 401 in the LCD 101.

When cooperation partner information is received from the communication unit 205 of the control apparatus, the communication unit 306 of the mobile device 300 outputs the cooperation partner information to the cooperation state detection unit 304. When display information is received from the communication unit 205 of the control apparatus, the communication unit 306 stores the display information in the display information storage unit 309.

When cooperation partner information is input, the cooperation state detection unit 304 stores the cooperation partner information in the cooperation state storage unit 308.

The cooperation partner information stored in the cooperation state storage unit 308 is used, for example, as an identifier to identify, among a plurality of the display apparatuses 100 present in a network of the device cooperation system 10, the display apparatus 100 as a cooperation partner of the mobile device 300.

The display control unit 305 reads display information corresponding to the display apparatus 100 as a cooperation partner of the mobile device 300 from the display information storage unit 309 and shows the display information in the display unit 301.

In the present embodiment, the control apparatus 200 decides a pair of the display apparatus 100 and the mobile device 300 as cooperation between the display apparatus 100 and the mobile device 300. The control apparatus 200 controls display information of the display apparatus 100 and the mobile device 300. Due to the above act, it seems to the user that the display apparatus 100 and the mobile device 300 cooperate to exchange information. The display apparatus 100 and the mobile device 300 decided by the control apparatus 200 may directly be connected via a network to exchange information.

After cooperation between the display apparatus 100 and the mobile device 300 being established, the cooperation may be cut off when the display apparatus 100 and the mobile device 300 move a predetermined distance away. Alternatively, cooperation may be cut off when a fixed time passes after the cooperation is established.

It is possible for one display apparatus 100 to cooperate with a plurality of the mobile devices 300.

It is also possible for one mobile device 300 to sequentially cooperate or cut off cooperation with a plurality of the display apparatuses 100. If, for example, while one of the display apparatuses 100 and the mobile device 300 carried by the user are in cooperation, the user is detected making a predetermined motion in front of the other display apparatus 100, the cooperation between the cooperating display apparatus 100 and the mobile device 300 is cut off to newly cooperate with the display apparatus 100 in front of which the user has made the predetermined motion.

Figure 18:
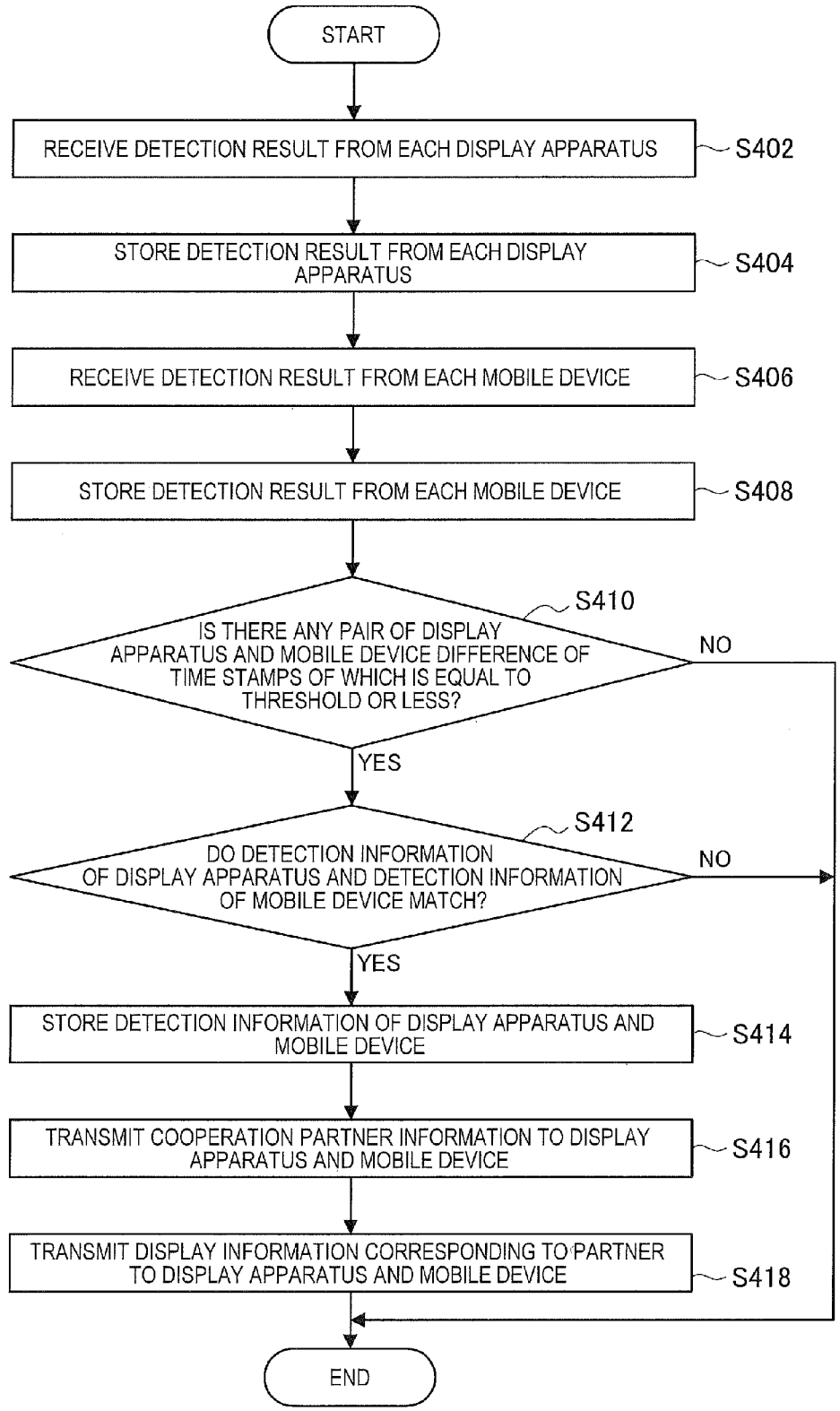

FIG. 18 is a diagram showing an example of the flow of cooperation partner decision processing and cooperation partner information transmission processing performed by the control apparatus 200. The flow of cooperation partner decision processing and cooperation partner information transmission processing performed by the control apparatus 200 will be described. After detection results from each of the display apparatuses 100 being received (S402), the communication unit 205 receives detection results from each of the mobile devices 300 (S406). Instead of the above case, the communication unit 205 may sequentially receive detection results from each of the display apparatuses 100 and each of the mobile devices 300 to output the detection results to the device detection unit 201 or the display apparatus detection unit 202.

Processing of the control apparatus 200 will be described by using the flow diagram in FIG. 18 and the function block diagram in FIG. 14. When a detection result is received from each of the display apparatuses 100, the communication unit 205 of the control apparatus 200 outputs the received detection result to the display apparatus detection unit 202 (S402).

The display apparatus detection unit 202 stores the input detection result in the detection information storage DB 206 (S404).

When a detection result is received from each mobile device, the communication unit 205 outputs the received detection result to the device detection unit 201 (S406).

The device detection unit 201 stores the input detection result in the detection information storage DB 206 (S408).

Next, the cooperation partner decision unit 203 reads a detection result from the detection information storage DB 206 to determine whether there is any pair of the display apparatus 100 and the mobile device 300 in which the difference of time stamps is equal to a threshold or less (S410).

If there is a pair of the display apparatus 100 and the mobile device 300 in which the difference of time stamps is equal to a threshold or less, the cooperation partner decision unit 203 advances the processing to the next step S412. If there is no pair of the display apparatus 100 and the mobile device 300 in which the difference of time stamps is equal to a threshold or less, the cooperation partner decision unit 203 terminates a sequence of processing.

In step S412, the cooperation partner decision unit 203 determines whether both pieces of detection information match in each pair of the display apparatus 100 and the mobile device 300 in which the difference of time stamps is equal to a threshold or less (S412). If there is no pair of the display apparatus 100 and the mobile device 300 in which both pieces of detection information match, the cooperation partner decision unit 203 determines that there are no cooperation partners and terminates a sequence of processing.

If there is any pair of the display apparatus 100 and the mobile device 300 in which the difference of time stamps is equal to a threshold or less and both pieces of detection information match, the cooperation partner decision unit 203 determines that the pair constitutes cooperation partners. The cooperation partner decision unit 203 stores information about pairs of the display apparatus 100 and the mobile device 300 in the cooperation state storage DB 207 and outputs the information to the display control information selection unit 204 (S414).

The cooperation partner decision unit 203 outputs cooperation partner information to be transmitted the display apparatus 100 and the mobile device 300 to the communication unit 205. The communication unit 205 transmits the cooperation partner information to the communication unit 106 of the display apparatus 100 and the communication unit 306 of the mobile device (S416).

The display control information selection unit 204 reads the display information to be displayed in the display apparatus 100 and the mobile device 300 from the display information DB 208 and outputs the display information to the communication unit 205. The communication unit 205 transmits the display information to the communication unit 106 of the display apparatus 100 and the communication unit 306 of the mobile device 300 before terminating the processing (S418).

Figure 19:
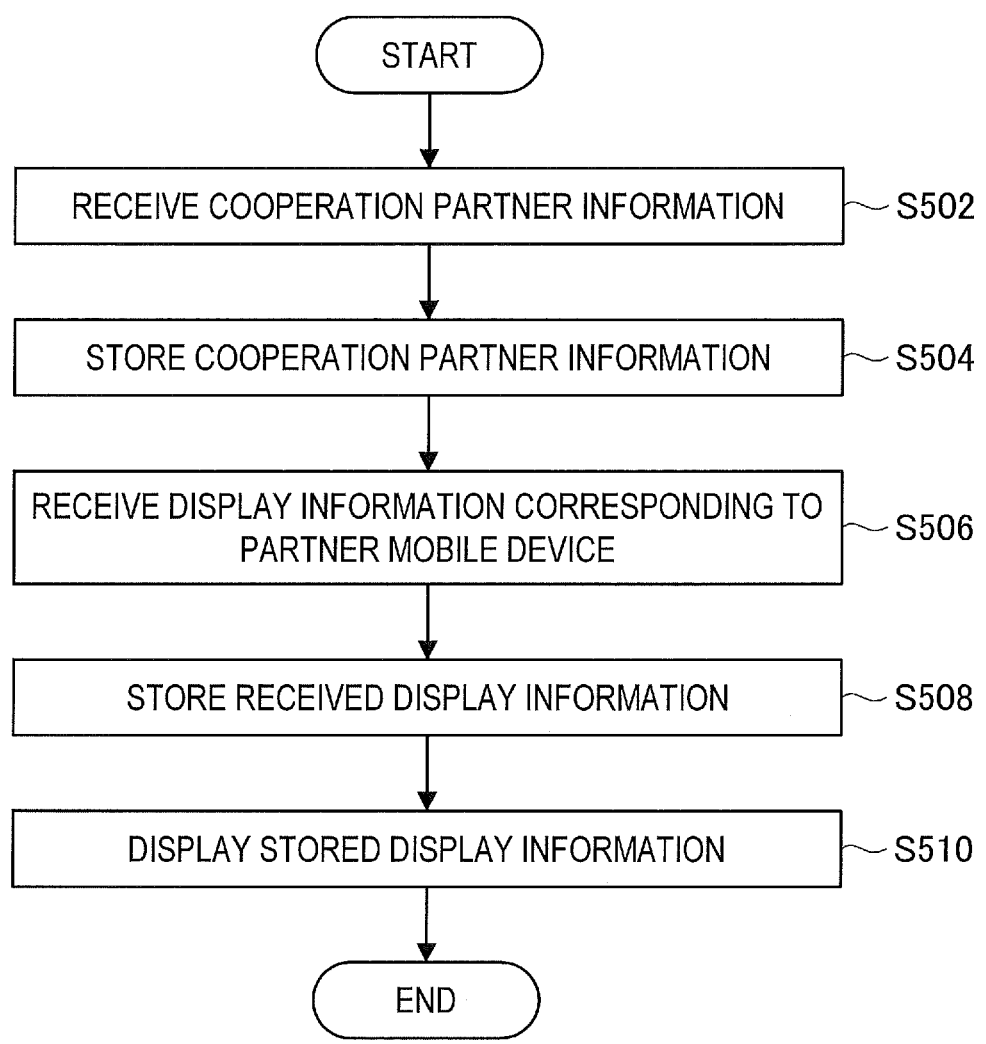

FIG. 19 is a diagram showing an example of the flow of cooperation partner information and display information reception processing performed by the display apparatus 100.

When cooperation partner information is received from the communication unit 205, the communication unit 106 of the display apparatus 100 outputs the cooperation partner information to the cooperation state detection unit 104 (S502).

When cooperation partner information is input, the cooperation state detection unit 104 causes the cooperation state storage unit 108 to store the cooperation partner information (S504).

The communication unit 106 of the display apparatus 100 receives display information corresponding to the mobile device 300 as a cooperation partner from the communication unit 205 of the control apparatus (S506).

The received display information is stored in the display information storage unit 109 (S508).

The display control unit 105 reads the display information 401 from the display information storage unit 109 and shows the display information 401 in the LCD 101 (S510).

FIG. 20 is a diagram showing an example of the flow of cooperation partner information and display information reception processing performed by the mobile device 300.

When cooperation partner information is received from the communication unit 205 of the control apparatus, the communication unit 306 of the mobile device 300 outputs the cooperation partner information to the cooperation state detection unit 304 (S602).

When cooperation partner information is input, the cooperation state detection unit 304 stores the cooperation partner information in the cooperation state storage unit 308 (S604).

The communication unit 306 of the mobile device 300 receives display information corresponding to the display apparatus 100 as a cooperation partner from the communication unit 205 of the control apparatus (S606).

The communication unit 306 stores the received display information in the display information storage unit 309 (S608).

The display control unit 305 reads display information from the display information storage unit 309 and shows the display information in the display unit 301 (S610).

According to the present embodiment, when the user makes a predetermined motion in front of the display apparatus 100, the motion is detected by the display apparatus 100 and the mobile device 300 carried by the user. The control apparatus 200 decides a pair of the display apparatus 100 and the mobile device 300 that communicate with each other based on detection results detected by the display apparatus 100 and the mobile device 300. The mobile device 300 carried by the user and the display apparatus 100 cooperate accurately with a light load on the user. If a plurality of display apparatuses dynamically change in position or is crowded, the display apparatus 100 and the mobile device 300 can accurately cooperate.

FIG. 21 is a diagram showing a display example according to the present embodiment. As a result of operation between the display apparatus 100 and the mobile device 300, as shown in FIG. 21, detailed content regarding the advertisement displayed in the display apparatus 100 is displayed in the display unit 301 of the mobile device 300. The owner of the display apparatus 100 can provide advertisements or information customized to users having different attributes. As an example, the following configuration can be realized: if the user vertically swings the mobile device 300 in the left hand, information about discount plans related to the travel agency displayed in the display apparatus 100. If the user horizontally swings the mobile device in the right hand, information about the normal plan is displayed in the display unit 301.

According to the present embodiment, the user can cause the display apparatus 100 and the mobile device 300 to cooperate while the display apparatus 100 and the mobile device 300 are separated from each other. The user of the mobile device 300 can gain cooperation between the display apparatus 100 and the mobile device 300 even in a public space without being noticed by third parties. In the present embodiment, no personal information is attached to information acquired from the sensor value acquisition unit 302 of the mobile device 300 and information acquired from the sensor value acquisition unit 102 of the display apparatus 100. Thus, the present embodiment serves the purpose of protecting personal information. If, for example, a temporarily available SSID (service set identification) is used for the communication unit, an advertisement acquisition unit of the space available only at that time can be established.

Heretofore, a preferred embodiment of the present invention have been described in detail with reference to the appended drawings, but the present invention is not limited thereto. It should be understood by those skilled in the art that various changes and alterations may be made without departing from the spirit and scope of the appended claims.

In the present embodiment, for example, the device cooperation system 10 including one or a plurality of the display apparatuses 100 is described, but the device cooperation system 10 may include a display unit by a medium such as a poster in place of one or a plurality of the display apparatuses 100. In this case, however, a sensor value acquisition unit having a function similar to that of the sensor value acquisition unit 102 of the display apparatus 100 is included in the periphery of each medium such as a poster.

What is claimed is:

1. A device cooperation control system comprising:
    a control apparatus; and
    a device that is carried by a user, the device including an acceleration sensor that acquires an acceleration value detected in accordance with a motion of the device, a communication unit that transmits the acquired acceleration value to the control apparatus, and a first display unit,
    wherein the control apparatus includes:
        a sensor value acquisition unit that acquires a sensor value detected in accordance with the motion of an object positioned in front of the control apparatus,
        a cooperation partner decision unit that determines whether a correspondence between the motion of the device and the motion of the object positioned in front of the control apparatus is present based, at least in part, on the acceleration value and the sensor value to decide whether the device is to be a partner that cooperates with the control apparatus based on a determination result,
        a second display unit to show display information, information about the display information additionally being shown on the first display unit, and
        a display control information selection unit that selects the display information shown by the first and second display units in accordance with the motion of the device if the device is determined to be a partner that cooperates with the control apparatus,
    wherein the object is the user, the acquired sensor value includes three-dimensional image data, and the sensor value acquisition unit acquires the three-dimensional images of the user, as the user faces the second display unit, to provide the sensor value, and
    wherein the cooperation partner decision unit uses three-dimensional motion of the user's hand and the acceleration value to determine whether a correspondence between them exists.

2. The device cooperation control system according to claim 1, wherein
    the control apparatus displays an advertisement in the second display unit, and
    when the control apparatus and the device cooperate, details of the advertisement are displayed on the first display unit.

3. The device cooperation control system according to claim 1,
    wherein the device further comprises a time acquisition unit that acquires first time information when the acceleration value is acquired, and the communication unit transmits the first time information to the control apparatus,
    wherein the control apparatus further comprises another time acquisition unit that acquires second time information when the sensor value is acquired by the sensor value acquisition unit, and
    wherein the cooperation partner decision unit decides that the device is to be a partner that cooperates with the control apparatus based on the acceleration value and the sensor value and also the first time information and the second time information.

4. The device cooperation control system according to claim 1, wherein
    the device includes a terminal state recognition unit that encodes the acceleration value to determine whether the motion of the user of the device is a first predetermined motion based on the encoded sensor value,
    when the motion of the user of the device is determined to be the first predetermined motion, the communication unit transmits the encoded acceleration value to the control apparatus,
    the control apparatus includes an apparatus forward state recognition unit that encodes the sensor value acquired by the sensor value acquisition unit to determine whether the motion of the user is a second predetermined motion based on the encoded acceleration value, and the cooperation partner decision unit decides the device is to be a partner that cooperates with the control apparatus based on the encoded acceleration value and the encoded sensor value when the motion of the user is determined to correspond to the second predetermined motion the photographed motion of the user's hand and the acceleration value.

5. The device cooperation control system according to claim 4, wherein if a difference between first time information when the acceleration value is acquired and second time information when the sensor value is acquired by the sensor value acquisition unit is smaller than a first threshold and the encoded acceleration value and the encoded sensor value match, the cooperation partner decision unit decides that the device is to be a partner that cooperates with the control apparatus.

\* \* \* \* \*